United States Patent
Fan et al.

(10) Patent No.: US 11,520,197 B2
(45) Date of Patent: Dec. 6, 2022

(54) ACTIVE-PIXEL DEVICE ASSEMBLIES WITH ROUGH COATING FOR STRAY-LIGHT REDUCTION, AND METHODS FOR MANUFACTURE

(71) Applicant: OmniVision Technologies, Inc., Santa Clara, CA (US)

(72) Inventors: Chun-Sheng Fan, Zhudong Township (TW); Wei-Feng Lin, Hsinchu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 218 days.

(21) Appl. No.: 16/875,953

(22) Filed: May 15, 2020

(65) Prior Publication Data
US 2021/0356821 A1 Nov. 18, 2021

(51) Int. Cl.
*G02F 1/1362* (2006.01)
(52) U.S. Cl.
CPC .. *G02F 1/136209* (2013.01); *G02F 1/136277* (2013.01); *G02F 1/136281* (2021.01)
(58) Field of Classification Search
CPC ........ G02F 1/136209; G02F 1/136277; G02F 1/136281
USPC ....................................................... 349/153
See application file for complete search history.

(56) References Cited

U.S. PATENT DOCUMENTS

| | | | |
|---|---|---|---|
| 9,653,504 B1 | 5/2017 | Lin et al. | |
| 10,204,947 B2 | 2/2019 | Chen et al. | |
| 10,243,014 B2 | 3/2019 | Lin et al. | |
| 10,312,276 B2 | 6/2019 | Chien et al. | |
| 2001/0021003 A1* | 9/2001 | Fujishiro | G03B 21/26 353/30 |
| 2014/0098513 A1* | 4/2014 | Yi | G02B 5/003 359/601 |
| 2017/0125467 A1 | 5/2017 | Lin et al. | |
| 2019/0129238 A1* | 5/2019 | Wang | G02F 1/136209 |
| 2021/0223612 A1* | 7/2021 | Pan | G02F 1/133512 |

FOREIGN PATENT DOCUMENTS

| | | |
|---|---|---|
| CN | 101706630 A | 5/2010 |
| TW | I425597 B | 2/2014 |
| TW | I463254 B | 12/2014 |
| TW | I527203 B | 3/2016 |

(Continued)

*Primary Examiner* — Edward J Glick
*Assistant Examiner* — David Y Chung
(74) *Attorney, Agent, or Firm* — Lathrop GPM LLP

(57) ABSTRACT

An active-pixel device assembly with stray-light reduction includes an active-pixel device including a semiconductor substrate and an array of active pixels, a light-transmissive substrate disposed on a light-receiving side of the active-pixel device, and a rough opaque coating disposed on a first surface of the light-transmissive substrate and forming an aperture aligned with the array of active pixels, wherein the rough opaque coating is rough so as to suppress reflection of light incident thereon from at least one side. A method for manufacturing a stray-light-reducing coating for an active-pixel device assembly includes depositing an opaque coating on a light-transmissive substrate such that the opaque coating forms a light-transmissive aperture, and roughening the opaque coating to form a rough opaque coating, said roughening including treating the opaque coating with an alkaline solution.

8 Claims, 12 Drawing Sheets

(56) References Cited

FOREIGN PATENT DOCUMENTS

| | | |
|---|---|---|
| TW | I614883 B | 2/2018 |
| WO | WO 2014000315 A1 | 1/2014 |
| WO | WO 2014000316 A1 | 1/2014 |

\* cited by examiner

ACTIVE-PIXEL DEVICE ASSEMBLIES WITH ROUGH COATING FOR STRAY-LIGHT REDUCTION, AND METHODS FOR MANUFACTURE

BACKGROUND

An active-pixel device contains an array of pixels formed in and/or on a substrate. Examples of active-pixel devices include liquid crystal on silicon (LCOS) and complementary metal-oxide semiconductor (CMOS) image sensors. In active-pixel devices, it is beneficial to ensure that light that reaches individual pixels can only have traveled along a desired geometric path from an intended location. Light that enters the active-pixel device and reaches the pixels through other paths is called stray light. Stray light may be damaging to both sensitivity and spatial resolution of active pixel devices since stray light contributes to noise rather than intended signal. Active-pixel devices therefore often use masks or coatings to create apertures and limit direct paths for light to reach the array of active pixels. In some conventional active-pixel devices, these efforts to reduce stray light take the form of coatings on the side of a cover glass positioned above the array of active pixels. Masks and coatings have been employed on the top face and underside of the cover glass to form an aperture that reduces the acceptance angle of the active-pixel device and thus reduce stray light signal.

SUMMARY OF THE INVENTION

The masks and coatings used in conventional active-pixel device assemblies are intended to block light from being transmitted but do not usually absorb the light. In some cases, light can reflect from these masks/coatings and continue to propagate in the assembly. Frequently, a cover glass and/or any focusing optics in an active-pixel device assembly have polished surfaces that can reflect incoming light. Thus, light reflected by the masks/coatings may propagate to the active pixels directly, or indirectly via one or more additional reflections off other surfaces. As a result, this reflected light can reach the active pixels and contribute to stray light signal, even in the presence of apertures and side-wall masks intended to prevent stray light.

The present invention ameliorates this problem by replacing conventional masks and apertures with low-reflectivity, rough surface coatings. These rough coatings are designed to have microscopic roughness that at least partially absorbs incoming light and prevents the incoming light from later reaching the active pixels. When disposed on a cover glass, the rough coatings may be configured to attenuate reflections from incoming light incident on the outside of the cover glass. Alternatively, or in combination therewith, the rough coatings may be configured to reduce reflections of light traveling inside the cover glass that otherwise would undergo internal reflection at the cover glass surface to continue propagation and potentially reach the active pixel array.

In an embodiment, an active-pixel device assembly with stray-light reduction includes an active-pixel device, a light-transmissive substrate, and a rough opaque coating. The active-pixel device includes a semiconductor substrate and an array of active pixels. The light-transmissive substrate is disposed on a light-receiving side of the active-pixel device. The rough opaque coating is disposed on a first surface of the light-transmissive substrate and forms an aperture aligned with the array of active pixels. The rough opaque coating is rough so as to suppress reflection of light incident thereon from at least one side.

In an embodiment, a method for manufacturing a stray-light-reducing coating for an active-pixel device assembly includes (a) depositing an opaque coating on a light-transmissive substrate such that the opaque coating forms a light-transmissive aperture, and (b) roughening the opaque coating to form a rough opaque coating. The roughening includes treating the opaque coating with an alkaline solution.

DETAILED DESCRIPTION OF THE EMBODIMENTS

Figure 1A:
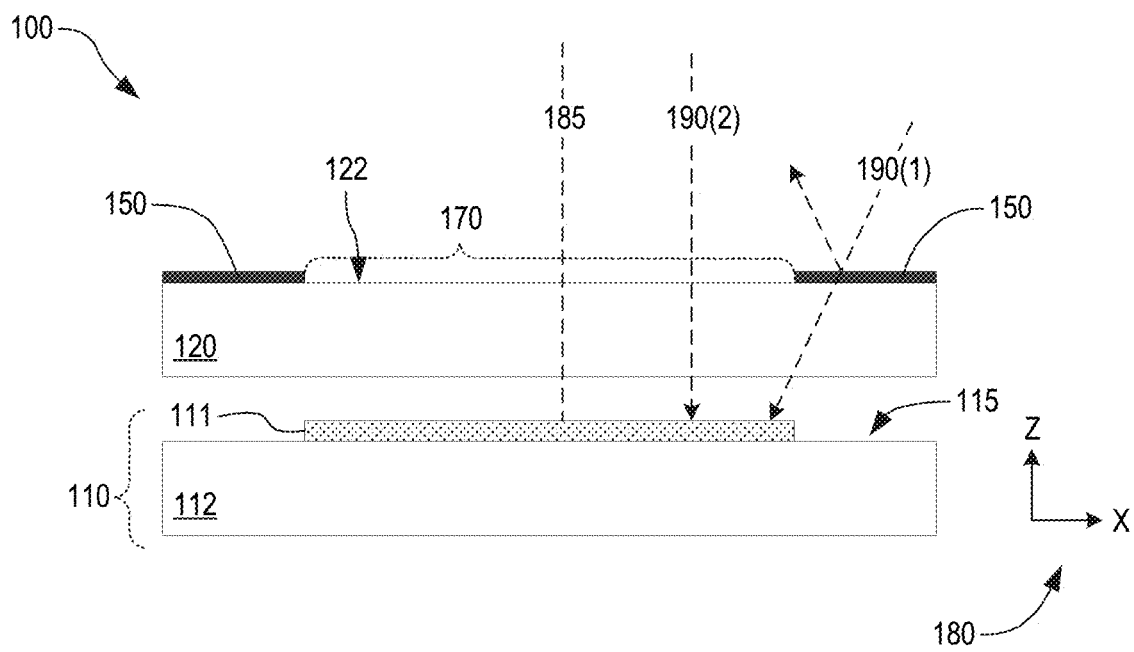
FIGS. 1A and 1B illustrate an active-pixel device assembly that includes a rough opaque coating for stray-light reduction, according to an embodiment.
Figure 1B:
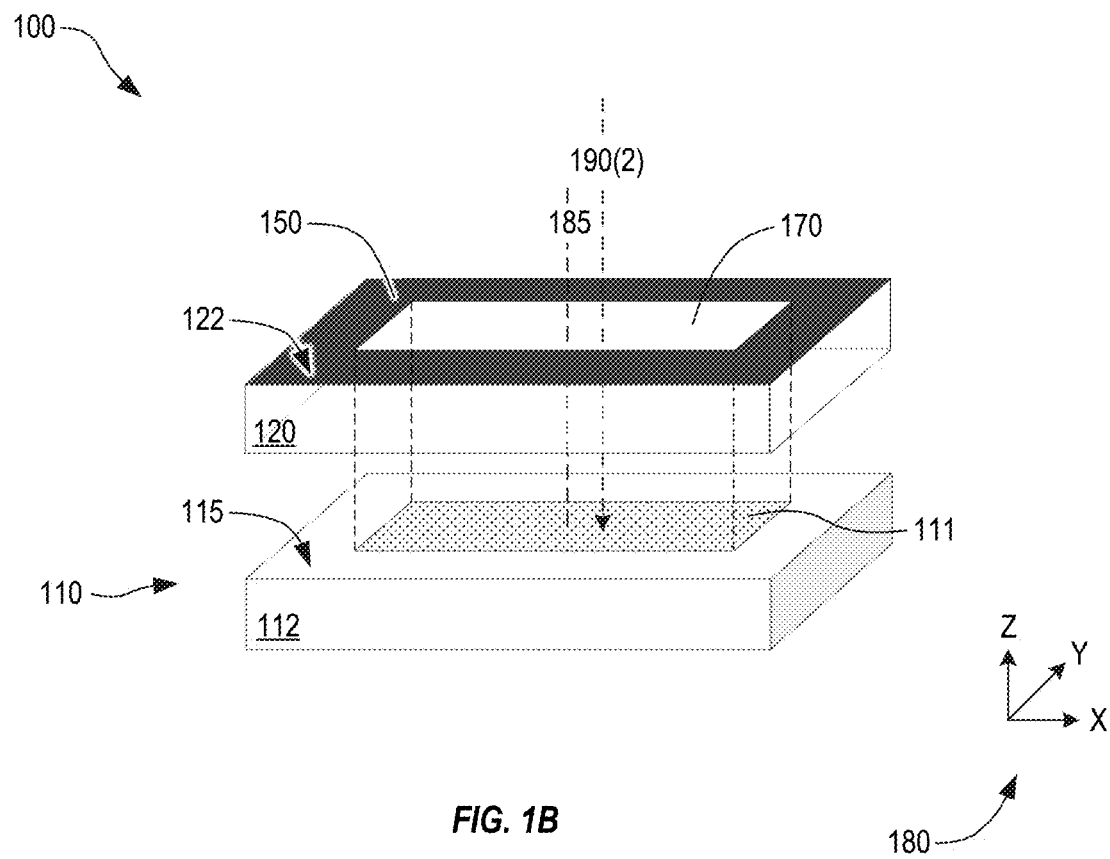

FIGS. 1A and 1B illustrate one active-pixel device assembly 100 that includes a rough opaque coating 150 for stray-light reduction. FIG. 1A is a cross-sectional side view of the active-pixel device assembly 100. FIG. 1B is a perspective view of the active-pixel device assembly 100. Each of FIGS. 1A and 1B further indicate a right-handed coordinate system 180. Hereinafter, "X axis", "Y axis", and "Z axis" refer to the X, Y, and Z axes of coordinate system 180. FIGS. 1A and 1B are best viewed together in the following description.

The active-pixel device assembly 100 includes an active-pixel device 110, a light-transmissive substrate 120, and the rough opaque coating 150. The active-pixel device 110 includes a semiconductor substrate 112 and an array of active pixels 111 formed in and/or on the semiconductor substrate 112. In one class of embodiments, the active-pixel device 110 is a liquid crystal on silicon (LCOS) device, and the array of active pixels 111 is an array of liquid crystals. In another class of embodiments, the active-pixel device 110 is a complementary metal-oxide semiconductor (CMOS) image sensor, and the array of active pixels 111 is an array of photosensitive pixels. The light-transmissive substrate 120 is disposed on a light-receiving side 115 of the active-pixel device 110. The light-transmissive substrate 120 may be a cover glass configured to physically protect the array of active pixels 111. The rough opaque coating 150 is disposed a top surface 122 of the light-transmissive substrate 120, which faces away from the active-pixel device 110. The rough opaque coating 150 forms an aperture 170 that is aligned with the array of active pixels 111. The aperture 170 allows light to pass through light-transmissive substrate 120 toward or away from the active array of active pixels 111. The rough opaque coating 150 at least partly blocks incoming light 190(1), incident on the rough opaque coating 150 outside the aperture 170, from reaching the array of active pixels 111. The rough opaque coating 150 has a rough surface such that the rough opaque coating 150 not only blocks incoming light 190(1) but also reduces (or eliminates) reflection of light 190(1) incident thereon. The rough opaque coating 150 may suppress reflection of light 190(1) by absorbing all or some of light 190(1).

Incoming light 190(2) enters parallel to the optical axis 185, which is parallel to the Z axis. The light-receiving side 115 of the active-pixel device 110 is perpendicular to an optical axis 185 and is parallel to plane that includes the X and Y axes. Without departing from the scope hereof, the aperture 170 may have smaller or larger extent than the array of active pixels 111.

Figure 2:
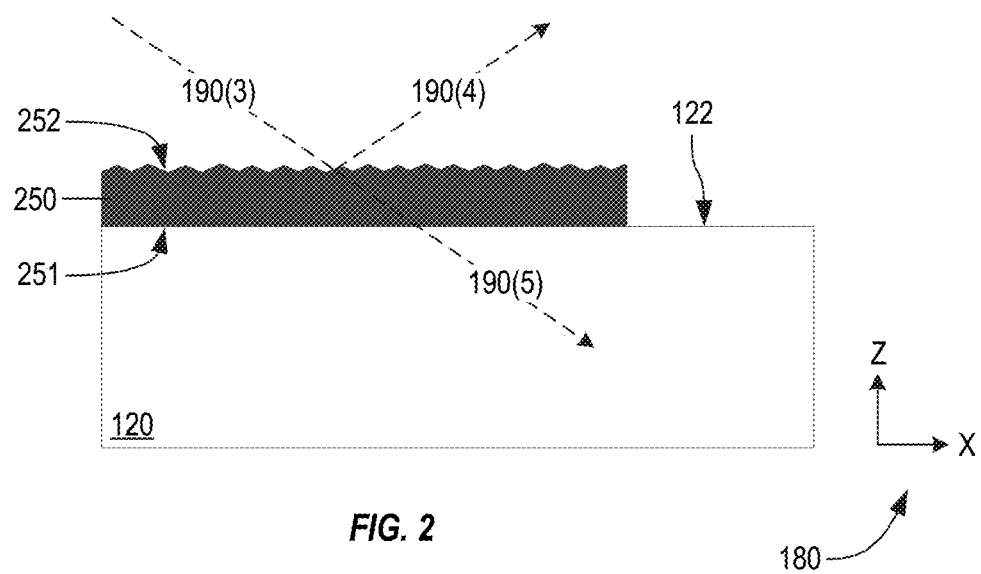
FIG. 2 illustrates a single-sided rough opaque coating that is disposed on the top surface of a light-transmissive substrate, according to an embodiment.

FIG. 2 illustrates one single-sided rough opaque coating 250 that is disposed on the top surface 122 of the light-transmissive substrate 120. The single-sided rough opaque coating 250 is an embodiment of the rough opaque coating 150. The rough opaque coating 250 includes an interfacial side 251 that faces the light-transmissive substrate 120 and an external side 252 that faces away from the light-transmissive substrate 120. The rough opaque coating 250 is rough on the external side 252 to at least partially prevent incoming light 190(3) from reflecting 190(4) from the external side 252 of the rough opaque coating 250. It is advantageous to at least partly suppress reflected light 190(4) because it can reflect off other surfaces (e.g., the surface of a focusing optic coupled to the active-pixel device assembly 100) and reach the array of active pixels 111 leading to stray light signal, which reduces resolution and sensitivity of the active-pixel device 110. As described above for rough opaque coating 150, the rough opaque coating 250 at least partly blocks incoming light 190(3) from entering the light-transmissive substrate 120, where it can otherwise continue on 190(5) to the array of active pixels 111 and lead to unwanted signal. Since light 190(3) is incident outside of the aperture 170 (shown in FIGS. 1A and 1B) it is not within the desired light-path of the active-pixel device 110.

The material properties of the single-sided rough opaque coating 250 may be similar to those of the rough opaque coating 150.

Figure 3:
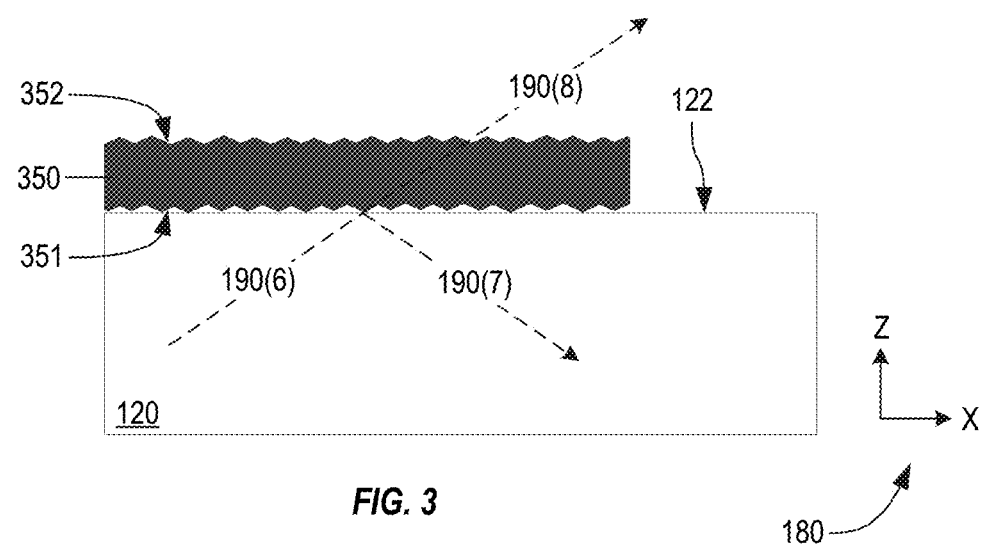
FIG. 3 illustrates a double-sided rough opaque coating that is disposed on the top surface of a light-transmissive substrate, according to an embodiment.

FIG. 3 illustrates one double-sided rough opaque coating 350 that is disposed on the top surface 122 of the light-transmissive substrate 120. The double-sided rough opaque coating 350 is an embodiment of rough opaque coating 150. The rough opaque coating 350 includes an interfacial side 351 that faces the light-transmissive substrate 120 and an external side 352 that faces away from the light-transmissive substrate 120. The rough opaque coating 350 is rough on the external side 352 for reasons similar to those discussed above for single-sided rough opaque coating 250. The rough opaque coating 350 is also rough on the interfacial side 351 to at least partially prevent incoming light 190(6) from reflecting 190(7) from the interfacial side 351 of the rough opaque coating 350. It is advantageous to at least partly suppressing reflected light 190(7) because it can continue to propagate and reach the array of active pixels 111 leading to stray light signal, which reduces resolution and sensitivity of the active-pixel device 110. Incoming light 190(6) may originate from the active pixels 111 or from light that is reflected by the light-receiving side 115 of the active-pixel device 110 after having reached the active-pixel device 110 through the aperture 170. The rough opaque coating 350 also blocks incoming light 190(6) from exiting the light-transmissive substrate 120 where it can continue on 190(8) to potentially reflect off other surfaces within the active-pixel device assembly 100 to reach the array of active pixels 111 and lead to unwanted signal.

The material properties of the double-sided rough opaque coating 350 may be similar to those of the rough opaque coating 150.

Figure 4A:
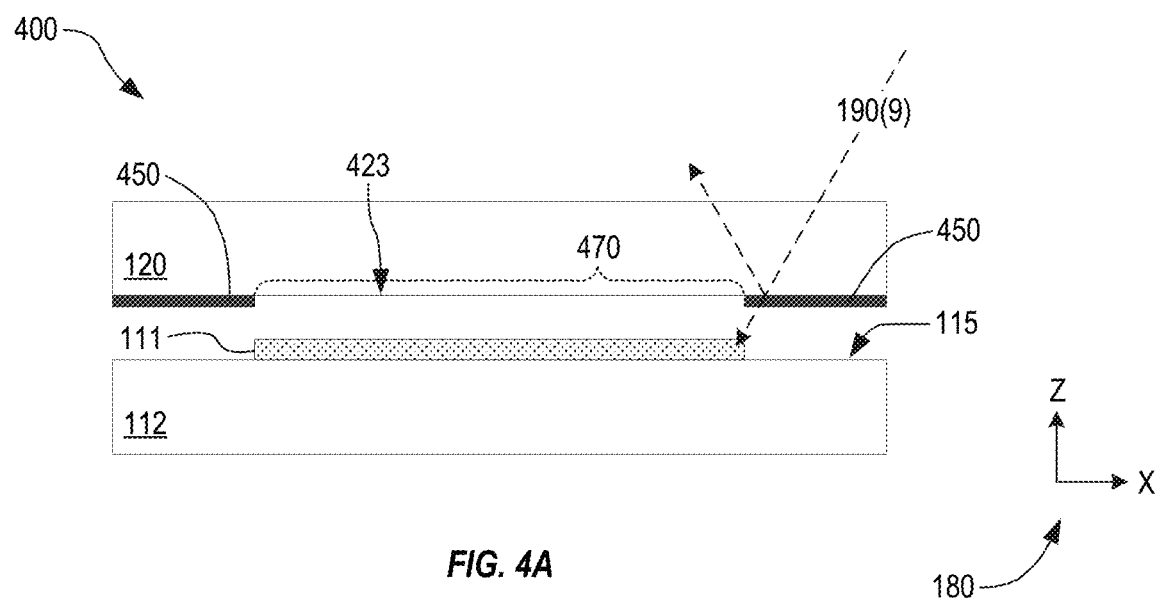
FIGS. 4A and 4B illustrate another active-pixel device assembly that includes a rough opaque coating for stray-light reduction, according to an embodiment.
Figure 4B:
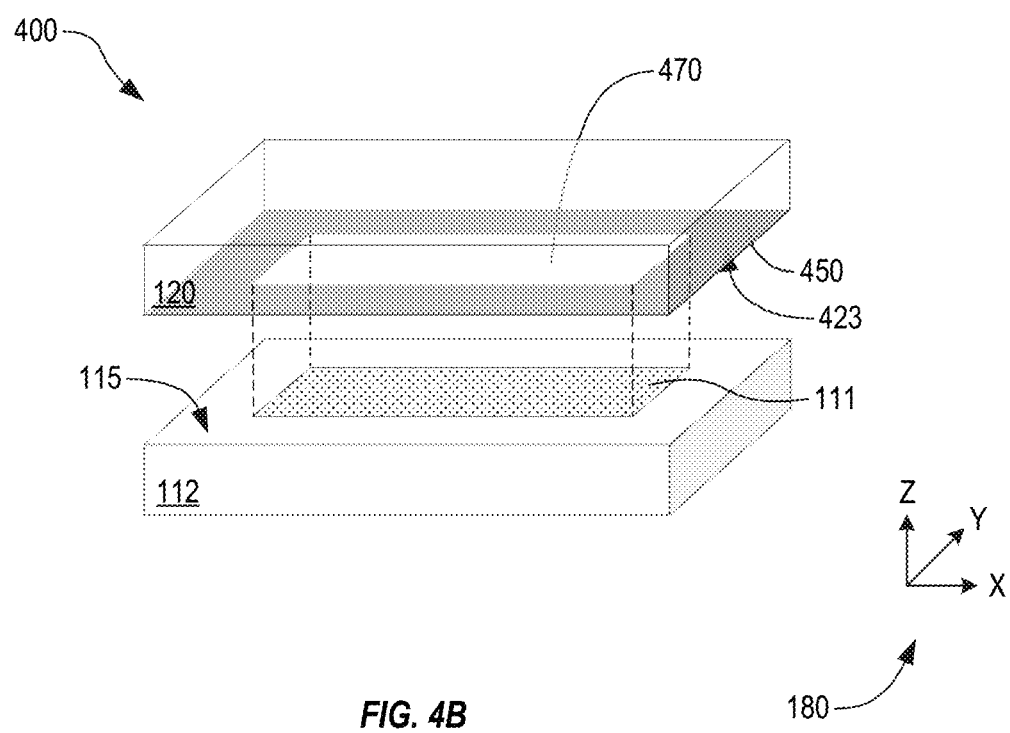

FIGS. 4A and 4B illustrate another active-pixel device assembly 400 that includes a rough opaque coating 450 for stray-light reduction. FIG. 4A is a cross-sectional side view of the active-pixel device assembly 100. FIG. 4B is a perspective view of the active-pixel device assembly 100. Each of FIGS. 4A and 4B further indicate right-handed coordinate system 180. FIGS. 4A and 4B are best viewed together in the following description.

The active-pixel device assembly 400 is a modification of the active-pixel device assembly 100, wherein the rough opaque coating 150 disposed on the top surface 122 of the light-transmissive substrate 120 is replaced by a rough opaque coating 450 that is disposed on a bottom surface 423 of the light-transmissive substrate 120. The bottom surface 423 of the light-transmissive substrate 120 faces toward the active-pixel device 110. The rough opaque coating 450 forms an aperture 470 that is aligned with the array of active pixels 111. The aperture 470 allows light to pass through light-transmissive substrate 120 toward or away from the active array of active pixels 111. The rough opaque coating 450 at least partly blocks incoming light 190(9), incident on the rough opaque coating 450 outside the aperture 470, from reaching the array of active pixels 111. The rough opaque coating 450 has a rough surface such that the rough opaque coating 450 not only blocks incoming light 190(9) but also reduces (or eliminates) reflection of light 190(9) incident thereon. Rough opaque coating 450 may suppress reflection of light 190(9) by absorbing all or some of light 190(9). Without departing from the scope hereof, the aperture 470 may have smaller or larger extent than the array of active pixels 111.

The material properties of the rough opaque coating 450 may be similar to those of the rough opaque coating 150.

Figure 5:
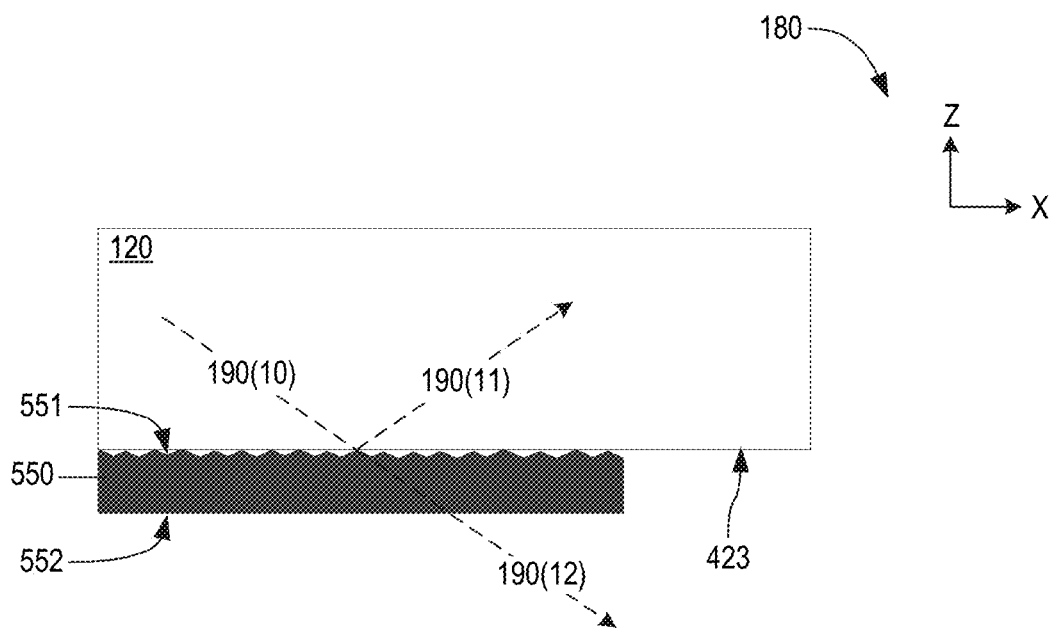
FIG. 5 illustrates a single-sided rough opaque coating that is disposed on the bottom surface of a light-transmissive substrate, according to an embodiment.

FIG. 5 illustrates one single-sided rough opaque coating 550 that is disposed on the bottom surface 423 of the light-transmissive substrate 120. The single-sided rough opaque coating 550 is an embodiment of the rough opaque coating 450. The rough opaque coating 550 includes an interfacial side 551 that faces the light-transmissive substrate 120 and an external side 552 that faces away from the light-transmissive substrate 120. The rough opaque coating 550 is rough on the interfacial side 551 to at least partially prevent incoming light 190(10) from reflecting 190(11) from the interfacial side 551 of the rough opaque coating 550. It is advantageous to at least partly suppressing reflected light 190(11) because it can reflect off subsequent surfaces and reach the array of active pixels 111 leading to stray light signal, which reduces resolution and sensitivity of the active-pixel device 110. As described above for rough opaque coating 450, the rough opaque coating 550 at least partly blocks incoming light 190(10) from exiting the light-transmissive substrate 120 at the bottom surface 423 where it can continue on 190(12) to the array of active pixels 111 and lead to unwanted signal. Since light 190(10) is incident outside of the aperture 470 (shown in FIGS. 4A and 4B) it is not within the desired light-path of the active-pixel device 110.

The material properties of the single-sided rough opaque coating 550 may be similar to those of the rough opaque coating 150.

Figure 6:
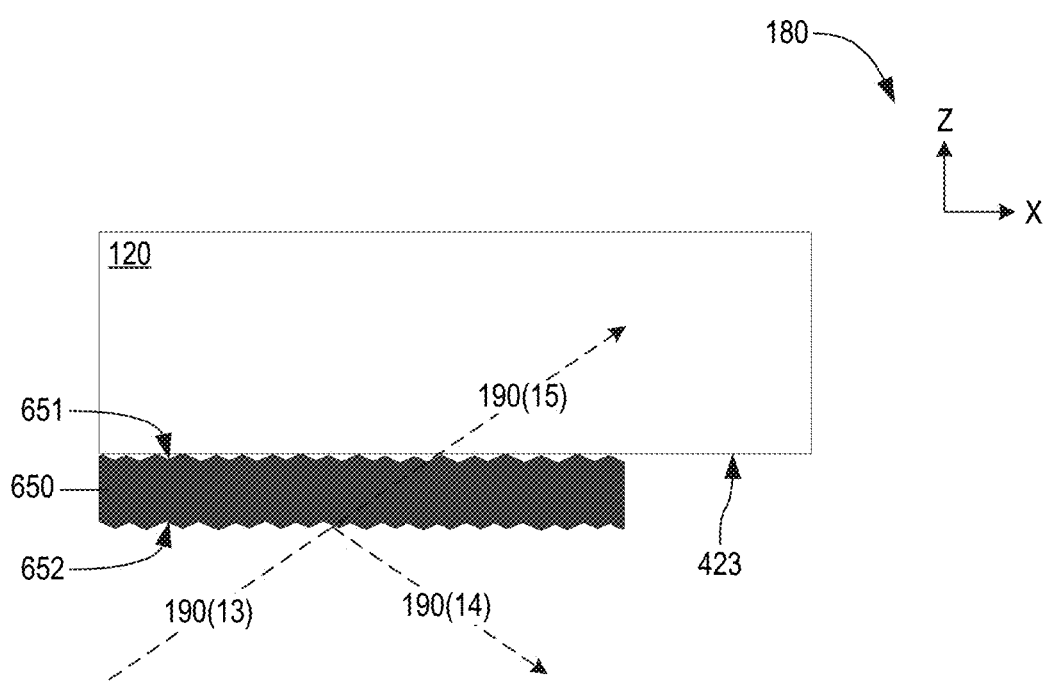
FIG. 6 illustrates a double-sided rough opaque coating that is disposed on the bottom surface of a light-transmissive substrate, according to an embodiment.

FIG. 6 illustrates one double-sided rough opaque coating 650 that is disposed on the bottom surface 423 of the light-transmissive substrate 120. The double-sided rough opaque coating 650 is an embodiment of rough opaque coating 450. The rough opaque coating 650 includes an interfacial side 651 that faces the light-transmissive substrate 120 and an external side 652 that faces away from the light-transmissive substrate 120. The rough opaque coating 650 is rough on the interfacial side 651 for reasons similar to those discussed above for single-sided rough opaque coating 550. The rough opaque coating 650 is also rough on the external side 652 to at least partly prevent incoming light 190(13) from reflecting 190(14) from the external side 652 of the rough opaque coating 650. It is advantageous to at least partly suppress reflected light 190(14) because it can continue to propagate and reach the array of active pixels 111 leading to stray light signal, which reduces resolution and sensitivity of the active-pixel device 110. The origin of incoming light 190(13) may be similar to the origin of incoming light 190(6) discussed above in reference to FIG. 3. The rough opaque coating 650 also blocks incoming light 190(13) from entering the light-transmissive substrate 120 where it can continue on 190(15) to potentially reflect off other surfaces within the active-pixel device assembly 100 to reach the array of active pixels 111 and lead to unwanted signal.

The material properties of the double-sided rough opaque coating 650 may be similar to those of the rough opaque coating 150.

Figure 7:
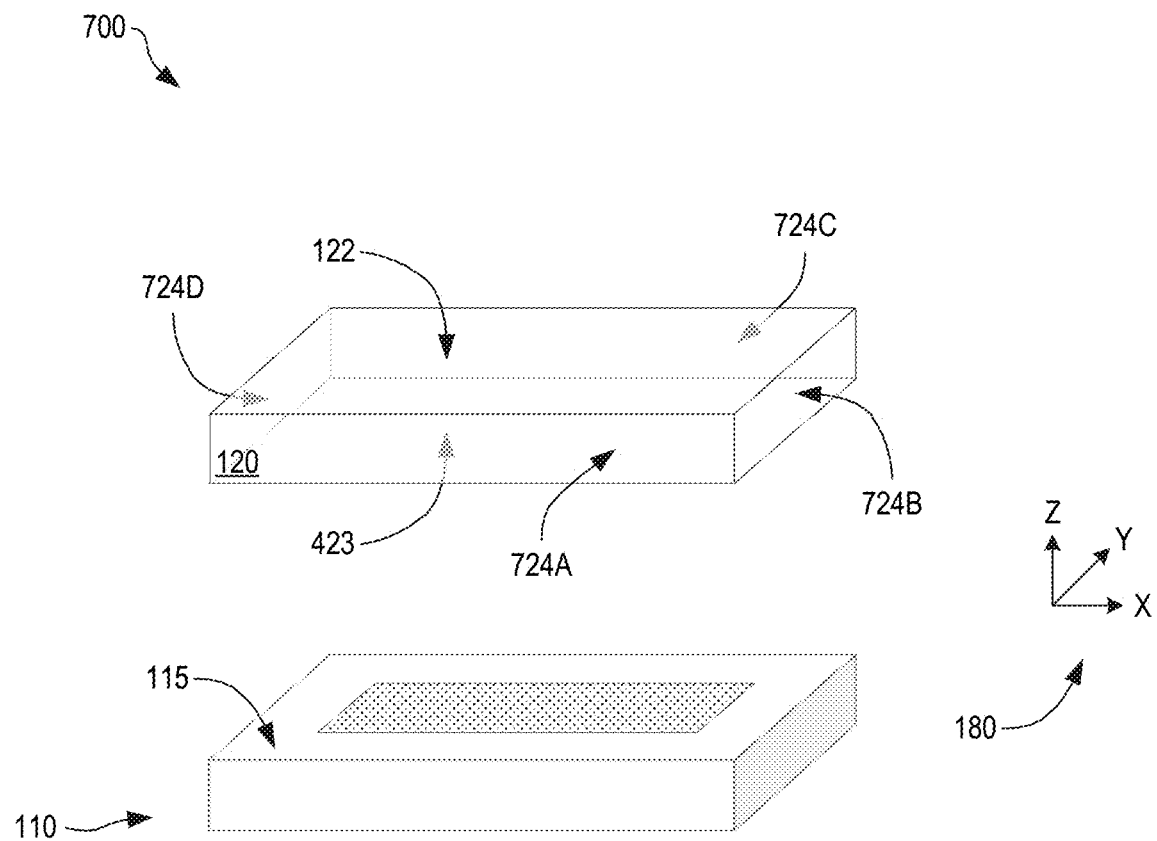
FIG. 7 shows a diagram that indicates the top surface, the bottom surface, and a plurality of side surfaces of a light-transmissive substrate, according to an embodiment.

FIG. 7 is a diagram 700 that includes a perspective drawing of the light-transmissive substrate 120 and the active-pixel device 110 of the active-pixel device assembly 100, with the light-transmissive substrate 120 and the corresponding right-hand coordinate system 180. The top surface 122 faces away from the active-pixel device 110 and the bottom surface 423 faces towards the active-pixel device 110. Also illustrated in FIG. 7, the light-transmissive substrate 120 has a plurality of side faces 724 that are substantially perpendicular to the top surface 122. In an embodiment, the plurality of side faces 724 of the light-transmissive substrate 120 contain four individual side faces, 724(A), 724(B), 724(C), and 724(D), as shown in FIG. 7.

Figure 8A:
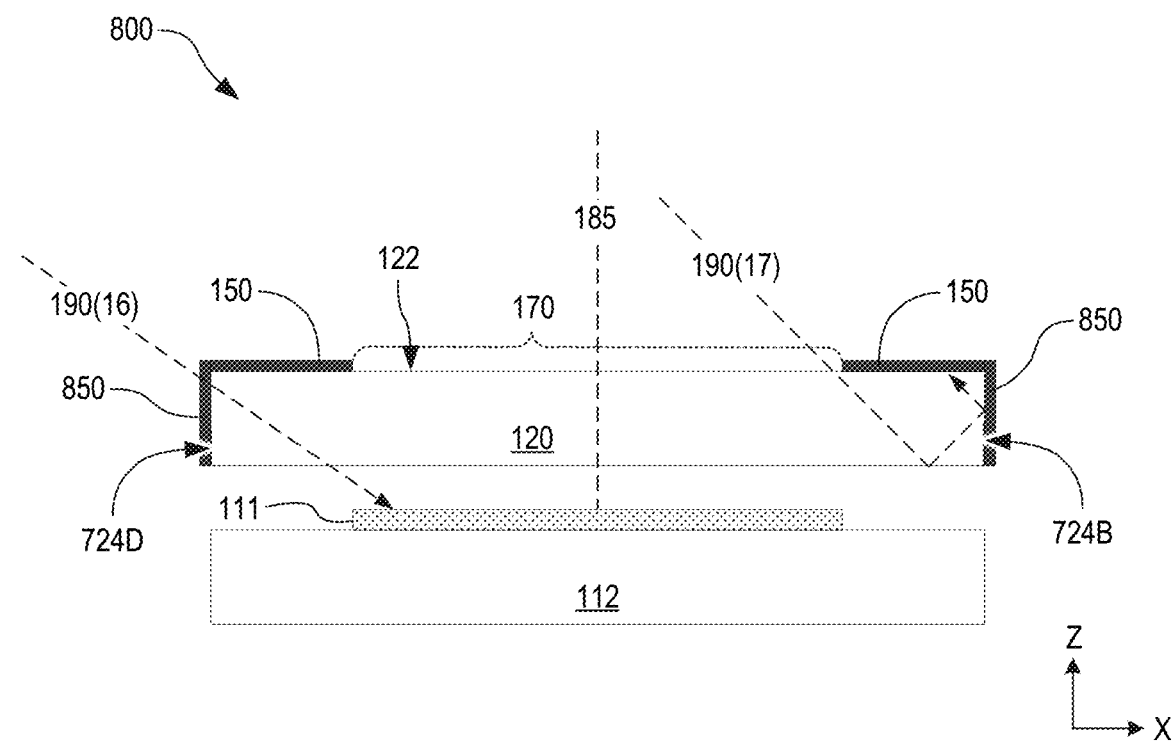
FIGS. 8A and 8B illustrate an active-pixel device assembly that, for stray-light reduction purposes, includes rough coatings on the top surface as well as on one or more side faces of a light-transmissive substrate, according to an embodiment.
Figure 8B:
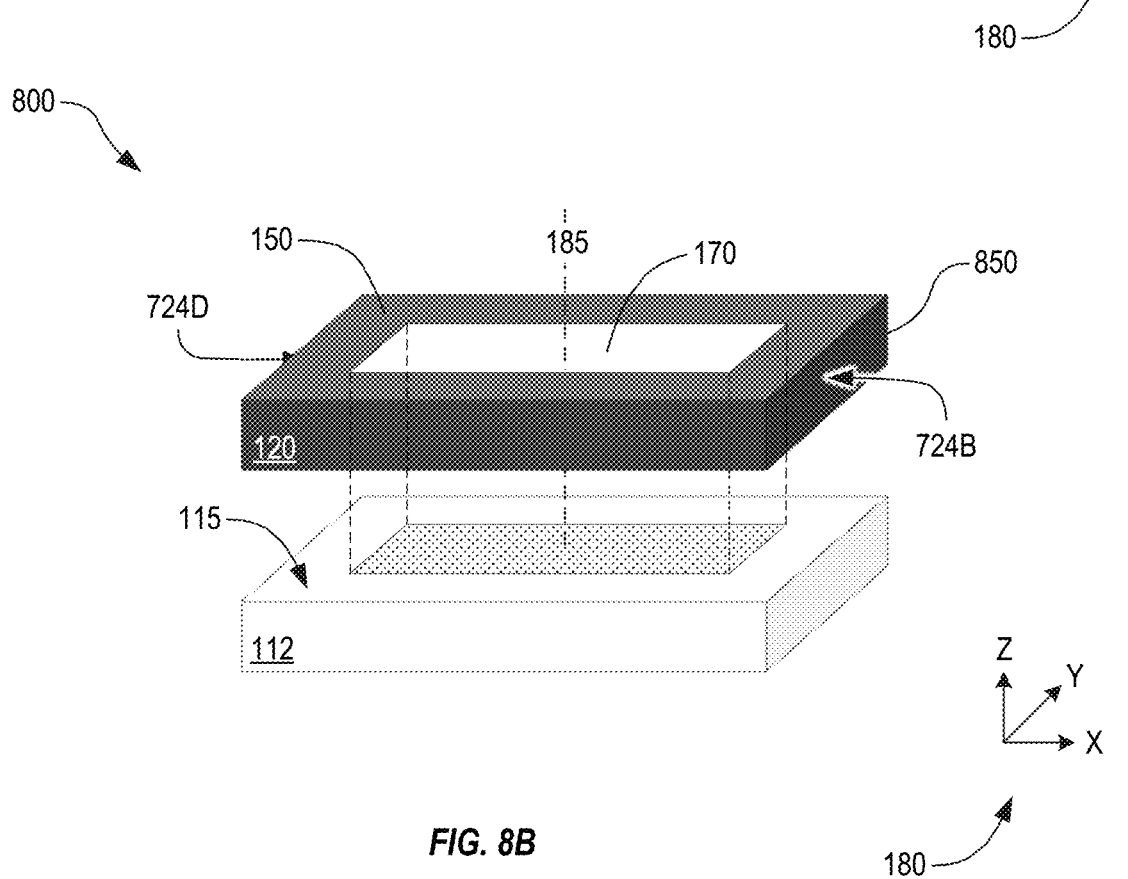

FIGS. 8A and 8B illustrate one active-pixel device assembly 800 that, for stray-light reduction purposes, includes rough coatings on the top surface 122 as well as on one or more side faces of the light-transmissive substrate 120. FIG. 8A is a cross-sectional side view of the active-pixel device assembly 800. FIG. 8B is a perspective view of the active-pixel device assembly 800. Each of FIGS. 8A and 8B further indicate right-handed coordinate system 180. FIGS. 8A and 8B are best viewed together in the following description.

The active-pixel device assembly 800 shown is an extension of the active-pixel device assembly 100 to not only include the rough opaque coating 150 but also include a rough opaque coating 850 on one or more side faces of the light-transmissive substrate 120. In the embodiment shown in FIGS. 8A and 8B, the rough opaque coating 850 is disposed on a plurality of side faces 724 of the light-transmissive substrate 120. In an embodiment, each side face 724 is substantially parallel to the optical axis 185 (illustrated in FIGS. 1A and 1B) of the active-pixel device 110. The rough opaque coating 850 at least partially prevents light 190(16) and light 190(17) incident thereon from reaching the array of active pixels 111. The rough opaque coating 850 has a rough surface such that the rough opaque coating 850 not only blocks incoming light 190(16) but also reduces (or eliminates) reflection of light 190(17) incident thereon. Rough opaque coating 850 may suppress reflection of light 190(17) by absorbing all or some of light 190(17).

The material properties of the rough opaque coating 850 may be similar to those of the rough opaque coating 150.

Figure 9:
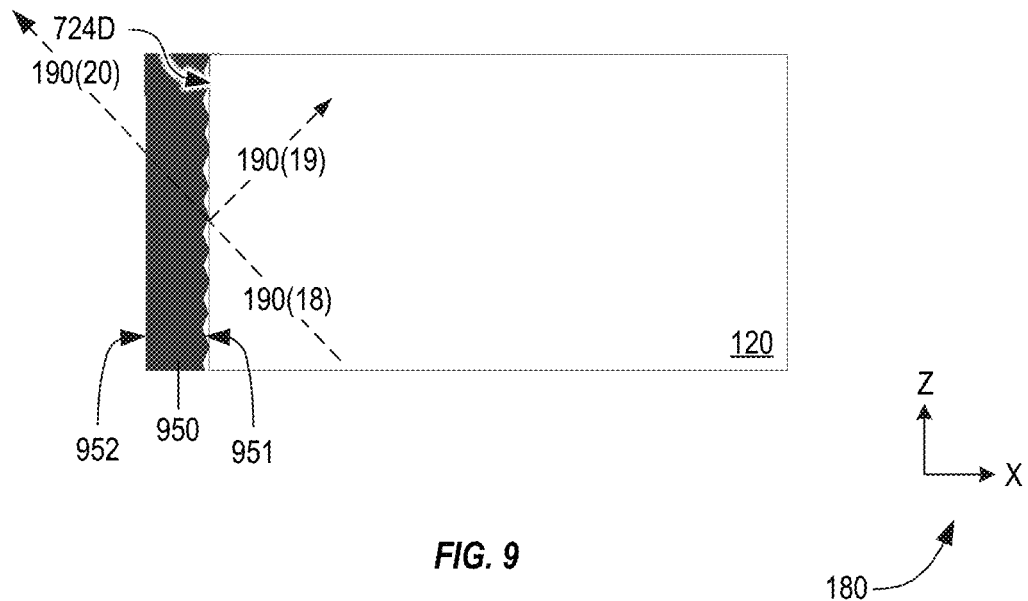
FIG. 9 illustrates a single-sided rough opaque coating that is disposed on the side face of a light-transmissive substrate.

FIG. 9 illustrates one single-sided rough opaque coating 950 that is disposed on the side face 724D of the light-transmissive substrate 120. The rough opaque coating 950 is an embodiment of the rough opaque coating 850 and may be disposed on any one of side faces 724 in active-pixel device assembly 800. The rough opaque coating 950 includes an interfacial side 951 that faces the light-transmissive substrate 120 and an external side 952 that faces away from the light-transmissive substrate 120. The rough opaque coating 950 is rough on the interfacial side 951 to at least partially prevent incoming light 190(18) from reflecting 190(19) from the interfacial side 951 of the rough opaque coating 950. It is advantageous to at least partly suppress reflected light 190(19) because it can reflect off subsequent surfaces and reach the array of active pixels 111 leading to stray light signal, which reduces resolution and sensitivity of the active-pixel device 110. The rough opaque coating 950 at least partly blocks light from entering the light-transmissive substrate 120 via side face 724D, and also at least partly blocks incoming light 190(18) from exiting the light-transmissive substrate 120 where it can continue on 190(20) to potentially reflect off other surfaces within the active-pixel device assembly 100 to reach the array of active pixels 111 and lead to unwanted signal.

The material properties of the single-sided rough opaque coating 950 may be similar to those of the rough opaque coating 150.

Figure 10:
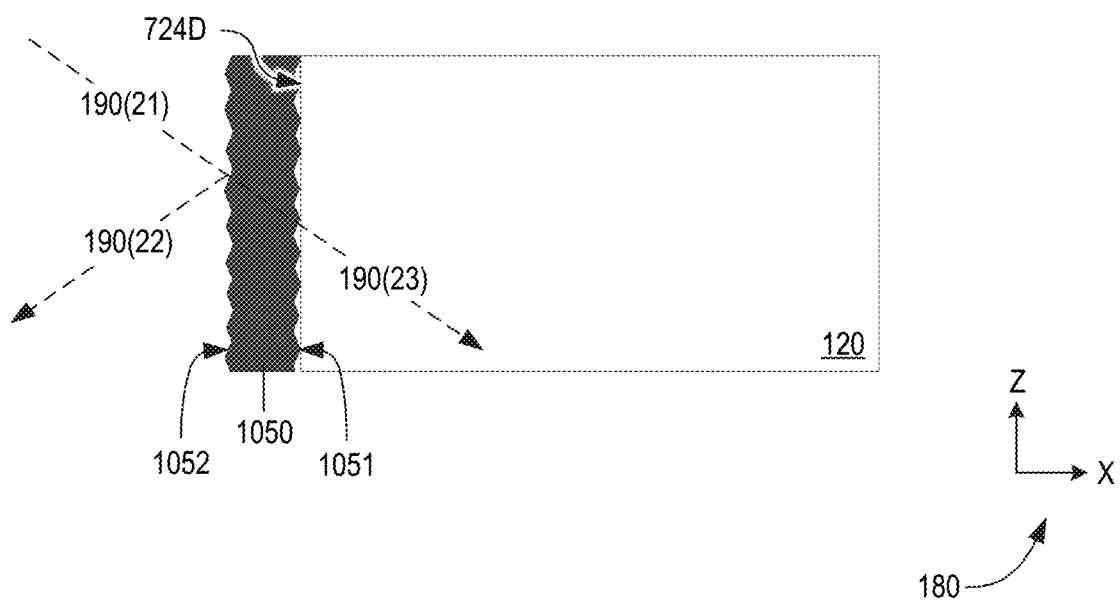
FIG. 10 illustrates a double-sided rough opaque coating that is disposed on the side face of a light-transmissive substrate.

FIG. 10 illustrates one double-sided rough opaque coating 1050 that is disposed on the side face 724D of the light-transmissive substrate 120. The rough opaque coating 1050 is an embodiment of the rough opaque coating 850 and may be disposed on any one of side faces 724 in active-pixel device assembly 800. The rough opaque coating 1050 includes an interfacial side 1051 that faces the light-transmissive substrate 120 and an external side 1052 that faces away from the light-transmissive substrate 120. The rough opaque coating 1050 is rough on the interfacial side 1051 for reasons similar to those discussed above for the single-sided rough opaque coating 950. The rough opaque coating 1050 is also rough on the external side 1052 to at least partially prevent incoming light 190(21) from reflecting 190(22) from the external side 1052 of the rough opaque coating 1050. It is advantageous to at least partly suppress reflected light 190(22) because it can continue potentially reflect off other surfaces and reach the array of active pixels 111 leading to stray light signal, which reduces resolution and sensitivity of the active-pixel device 110. As described above, the rough opaque coating 1050 also blocks incoming light 190(21) from entering the light-transmissive substrate 120 where it can continue on 190(23) to the array of active pixels 111 and lead to unwanted signal. Since light 190(21) is incident outside of the aperture 170 (shown in FIGS. 1A and 1B) it is not within the desired light-path of the active-pixel device 110.

The material properties of the double-sided rough opaque coating 1050 may be similar to those of the rough opaque coating 150.

Figure 11:
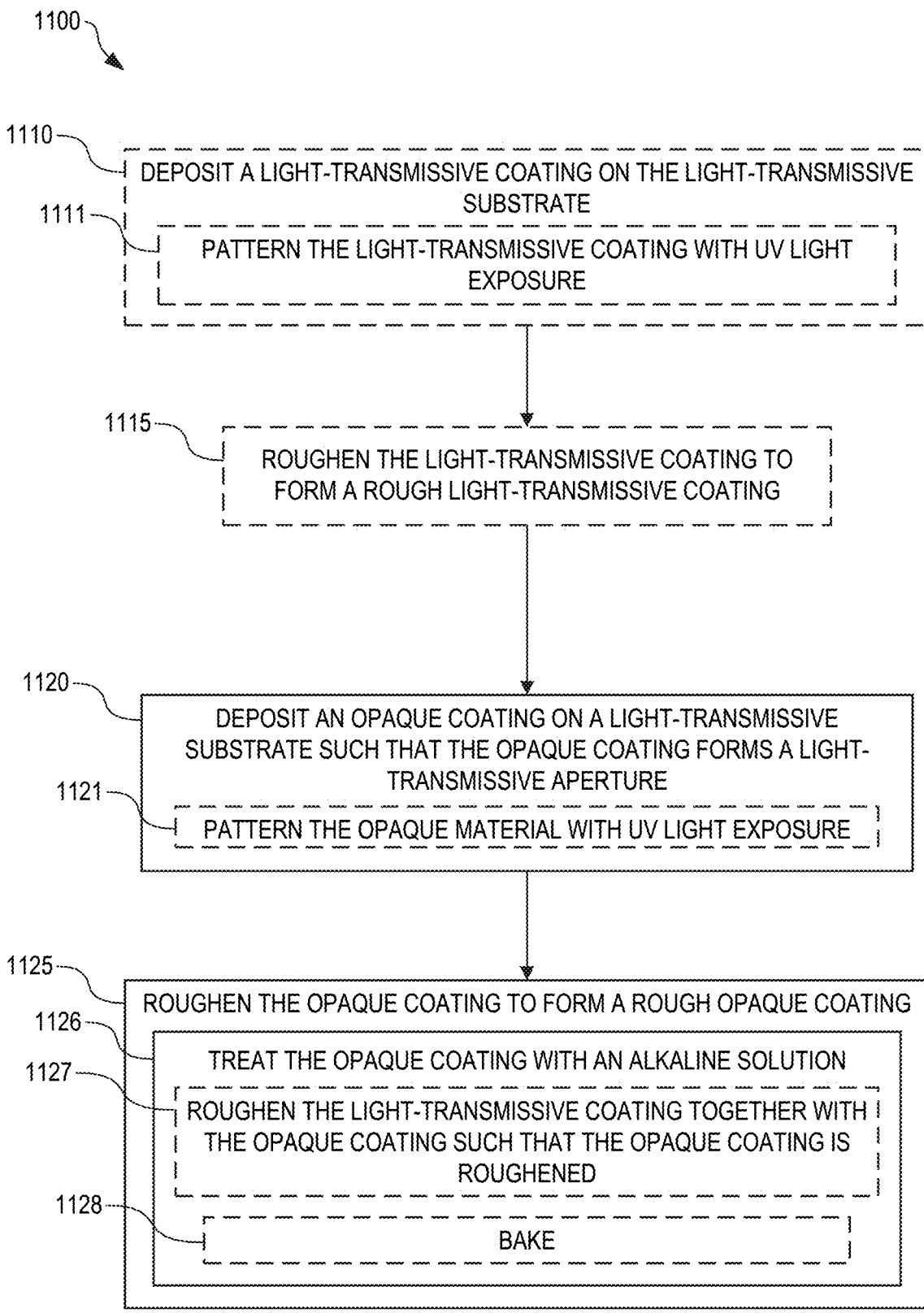
FIG. 11 illustrates a method for manufacturing a stray-light-reducing coating for an active-pixel device assembly.

FIG. 11 illustrates one method 1100 for manufacturing a stray-light-reducing coating for an active-pixel device assembly. Method 1100 may be used to manufacture the rough opaque coatings 150, 250, 350, 450, 550, 650, 850, 950, and 1050. Method 1100 includes steps 1120 and 1125. Step 1120 deposits an opaque coating on a light-transmissive substrate such that the opaque coating forms a light-transmissive aperture. Step 1125 is performed after step 1120 and roughens the opaque coating to form a rough opaque coating. The roughening of step 1125 includes a step 1126 of treating the opaque coating with an alkaline solution.

Figure 12:
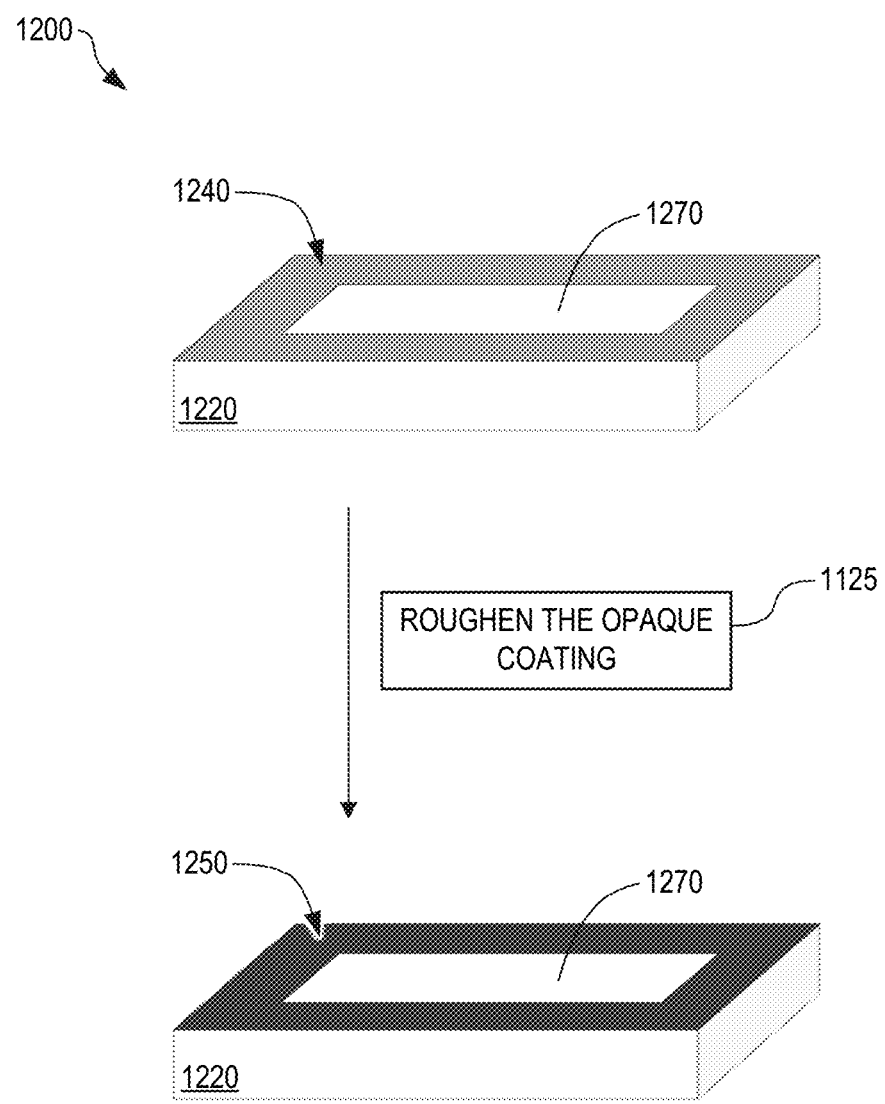
FIGS. 12 and 13 illustrate one example of the method of FIG. 11.
Figure 13:
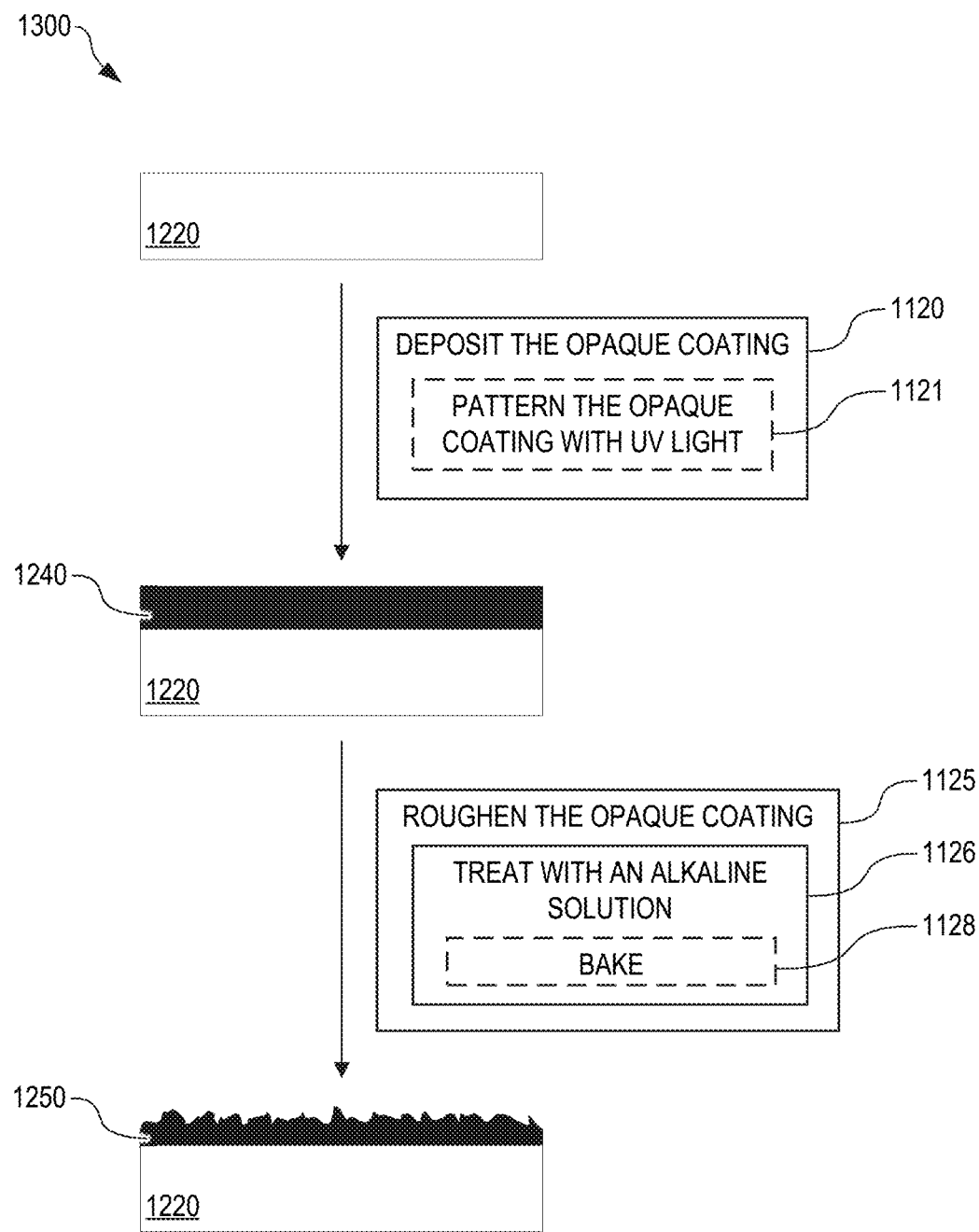

FIGS. 12 and 13 illustrate one example of method 1100. In this example, an opaque coating 1240 is deposited on a light-transmissive substrate 1220 in step 1120 to form an aperture 1270. Next, the opaque coating 1240 is roughened in step 1125 to form a rough opaque coating 1250. The light-transmissive substrate 1220 with the rough opaque coating 1250 may be implemented in any one of active-pixel device assemblies 100, 400, and 800 discussed above. Although not shown in FIGS. 11, 12, and 13, the coating deposited in step 1120 and roughened in step 1125 may extend along the sides of light-transmissive substrate 1220, to further form an example of the rough opaque coating 850 shown in FIG. 8.

Referring again to FIG. 11, step 1126 causes the surface of the opaque coating 1240 to become microscopically rough. This rough surface reduces the reflectivity of the opaque coating, deposited in step 1120, while maintaining its opaque nature. In an embodiment, the alkaline solution of step 1126 is chosen from a group that includes tetramethylammonium hydroxide (TMAH), potassium hydroxide, xylene, and ammonia. In an embodiment, the opaque coating deposited in step 1120 (e.g., opaque coating 1240) includes a monomer, and, during the step 1126 of treatment with an alkaline solution, the monomer groups aggregate to form a disordered rough surface (e.g., rough opaque coating 1250). This microscopically disordered surface reduces direct reflections, while also increasing the surface area for multiple reflections and increased opportunity for absorption of light by the rough opaque coating.

In an embodiment, the step 1126 of treating the opaque coating with an alkaline solution includes a step 1128 of baking to an elevated temperature to accelerate the roughening process in step 1125. The resulting rough opaque coating (e.g., rough opaque coating 1250) may have (a) a surface roughness described by an arithmetical mean height (Sa) in the range of 0.1 microns to 1 micron, (b) a reflectivity of less than 0.6% for visible light, and/or (c) a thickness of at least 0.15 microns (150 nm). In one embodiment, the thickness of the rough opaque coating is at least 1.5 times larger than the measured Sa. For example, the thickness of the rough opaque coating may be at least 0.75 microns to achieve Sa=0.5 microns or greater.

In an embodiment, step 1120 includes a step 1121 of patterning the opaque coating with UV light. In this embodiment, the opaque coating deposited in step 1120 includes a photosensitive compound for patterning with UV light. For example, the opaque coating may include one or more monomers chosen from the group consisting of ethylene monomers, acrylic monomers, and epoxy monomers. More generally, the opaque coating may include one or both of a carbon black pigment or a dye. In an embodiment of step 1120, the opaque coating is deposited with a thickness between at least 0.7 microns to ensure the rough opaque coating formed in step 1125 of roughening the opaque coating to form a rough opaque coating is thick enough to prevent the formation of holes through which light can propagate.

Figure 14:
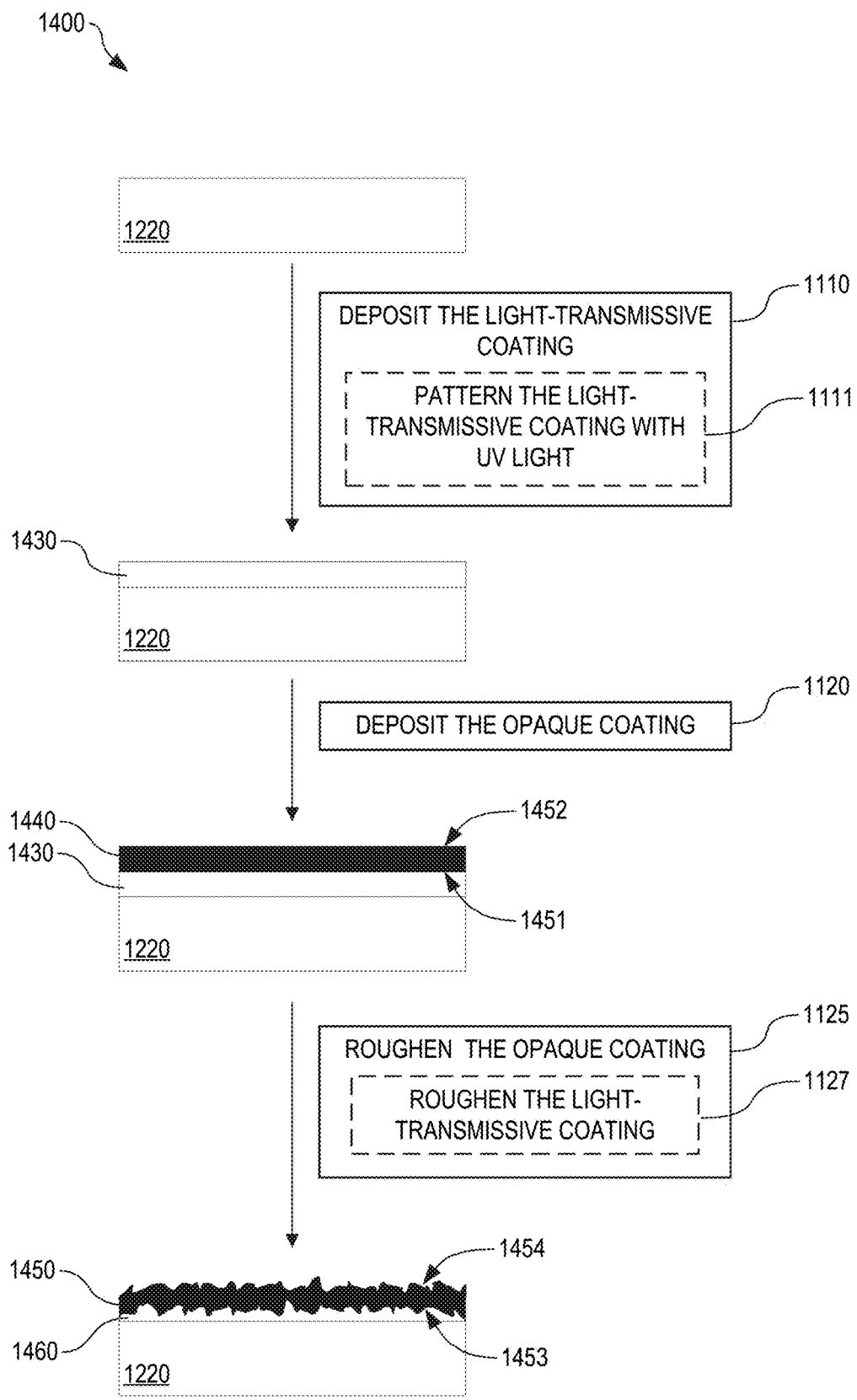
FIG. 14 illustrates one example of an embodiment of the method of FIG. 11 that forms a double-sided rough opaque coating.
Figure 15:
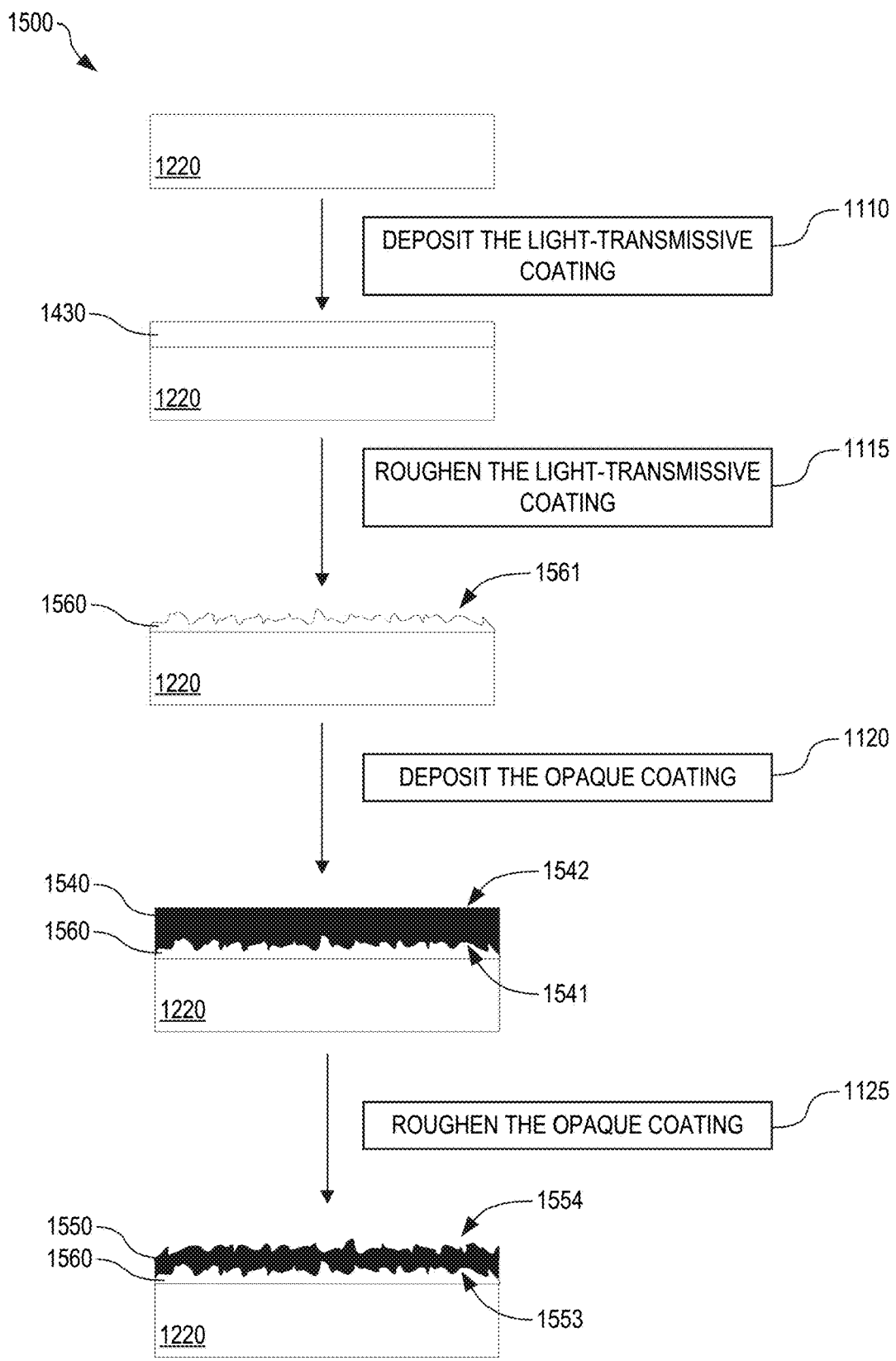
FIG. 15 illustrates another example of an embodiment of the method of FIG. 11 that forms a double-sided rough opaque coating.

In certain embodiments, method 1100 is adapted to form the rough opaque coating such that it is rough both on the side that faces away from the light-transmissive substrate and on the side that faces the light-transmissive substrate. Such embodiments of method 1100 further include a step 1110, performed prior to step 1120, of depositing a light-transmissive coating on the light-transmissive substrate, such that step 1120 deposits the opaque coating on top of the light-transmissive coating with an interfacial surface of the opaque coating facing the light-transmissive coating and an external surface of the opaque coating facing away from the light-transmissive coating. In one such embodiment, step 1126 includes a step 1127 of roughening the light-transmissive coating, such that the light-transmissive coating and the opaque coating are roughened together in step 1125. FIG. 14 shows one example of this embodiment. In another embodiment, the light-transmissive coating is roughened in a step 1115 prior to step 1120 of depositing the opaque coating. FIG. 15 shows one example of this embodiment. The light-transmissive coating may contain silicon dioxide powder with a particle diameter between 0.5 microns to 5 microns.

Referring first to the example of FIG. 14, step 1110 deposits a light-transmissive coating 1430 on the light-transmissive substrate 1220. The light-transmissive coating 1430 forms an aperture that, after completion of step 1120, coincides with the light-transmissive aperture 1270. Next, step 1120 deposits the opaque coating 1440 on the light-transmissive coating 1430. In this example, the opaque coating 1440 has an interfacial surface 1451 that faces towards the light-transmissive coating 1430 and an external surface 1152 that faces away from the light-transmissive coating 1430. Step 1125, including step 1127, then roughens the light-transmissive coating 1430 and the opaque coating 1440. This produces a rough opaque coating 1450 that has both a rough interfacial surface 1453 and a rough external surface 1454. The rough opaque coating 1450 at least partially reduces reflection of light incident on both the rough external surface 1454 and the rough interfacial surface 1453. These two rough surfaces retard light as illustrated in FIGS. 2, 3, 5, 6, 9, and 10, and the rough opaque coating 1450 forms an example of any one of rough opaque coatings 350, 650, and 1050.

Referring again to FIG. 11, in an embodiment, step 1110 includes a step 1111 of patterning the light-transmissive coating with UV light. The light-transmissive coating may include a photosensitive compound for patterning the light-transmissive coating 1130 with UV light. In an example, the light-transmissive coating may include one or more monomers chosen from the group consisting of ethylene monomers, acrylic monomers, and epoxy monomers. In an embodiment, the light-transmissive coating includes silicon dioxide ($SiO_2$) powder with particle size within the range of 0.5 microns to 5 microns. In an embodiment, the light-transmissive coating is deposited with a thickness of between 0.7 microns 10 microns.

Referring now to the example of FIG. 15, step 1110 deposits the light-transmissive coating 1430 on the light-transmissive substrate 1220 as described above in reference to FIG. 14. Next, the step 1115 forms rough light-transmissive coating 1560 with a with a rough external surface 1561 that faces away from the light-transmissive substrate 1220. The step 1115 of roughening may utilize a process similar to that of step 1125. Next, step 1120 deposits the opaque coating 1540 on the rough light-transmissive coating 1560. In this example, the opaque coating 1540 has an interfacial side 1541 that faces towards the rough light-transmissive coating 1560 and an external side 1542 that faces away from the rough light-transmissive coating 1560. The interfacial side 1541 is rough due to the rough nature of the rough light-transmissive coating 1560 onto which it is contacted. Step 1125 then roughens the opaque coating 1540, which produces a rough opaque coating 1550 that has both a rough interfacial side 1553 and a rough external side 1554. The rough opaque coating 1550 at least partially reduces reflection of light incident on both the rough external side 1554 and the rough interfacial side 1553. These two rough surfaces retard light as illustrated in FIGS. 2, 3, 5, 6, 9, and 10, and rough opaque coating forms an example of any one of rough opaque coatings 350, 650, and 1050.

Combinations of Features

Features described above as well as those claimed below may be combined in various ways without departing from the scope hereof. For example, it will be appreciated that aspects of one method, product, or system for baseline-free absorption spectroscopy, described herein, may incorporate or swap features of another method, product, or system for baseline-free absorption spectroscopy described herein. The following examples illustrate some possible, non-limiting combinations of embodiments described above. It should be clear that many other changes and modifications may be made to the methods, products, and systems herein without departing from the spirit and scope of this invention:

(A1) One active-pixel device assembly with stray-light reduction includes (a) an active-pixel device including a semiconductor substrate and an array of active pixels, (b) a light-transmissive substrate disposed on a light-receiving side of the active-pixel device, and (c) a rough opaque coating disposed on a first surface of the light-transmissive substrate and forming an aperture aligned with the array of active pixels, the rough opaque coating being rough so as to suppress reflection of light incident thereon from at least one side.

(A2) In the active-pixel device assembly denoted as (A1), the first surface of the light-transmissive substrate may face away from the active-pixel device, the rough opaque coating may have an interfacial side facing the light-transmissive substrate and an external side facing away from the light-transmissive substrate, and the rough opaque coating may be rough on its external side so as to suppress reflection of the light propagating toward the light-receiving side of the active-pixel device outside the aperture.

(A3) In the active-pixel device assembly denoted as (A2), the rough opaque coating may further be rough on its interfacial side so as to suppress reflection of light incident on the rough opaque coating from the light-transmissive substrate.

(A4) In the active-pixel device assembly denoted as (A1), the first surface of the light-transmissive substrate may face the active-pixel device, the rough opaque coating may have an interfacial side facing the light-transmissive substrate and an external side facing away from the light-transmissive substrate, and the rough opaque coating may be rough on its interfacial side so as to suppress reflection of the light incident on the rough opaque coating from the light-transmissive substrate.

(A5) In the active-pixel device assembly denoted as (A4), the rough opaque coating may further be rough on its external side so as to suppress reflection of light incident thereon.

(A6) In any of the active-pixel device assemblies denoted as (A1) through (A5), the light-transmissive substrate may have a plurality of side faces that are substantially perpendicular to the first surface of the light-transmissive substrate, and the rough opaque coating may further be disposed on the plurality of side faces of the light-transmissive substrate and forming a barrier to light.

(A7) In the active-pixel device assembly denoted as (A6), the rough opaque coating may have an interfacial side facing the light-transmissive substrate and an external side facing away from the light-transmissive substrate, and the rough opaque coating may be rough on its interfacial side so as to suppress reflection of light incident on the rough opaque coating from the light-transmissive substrate.

(A8) In any one of the active-pixel device assemblies denoted as (A1) through (A7), at least one side of the rough opaque coating may have a surface roughness characterized by an arithmetic mean within the range of 0.1 micron to 1 micron.

(A9) In any one of the active-pixel device assemblies denoted as (A1) through (A8), at least one side of the rough opaque coating may be characterized by a reflection coefficient that is less than 0.6 percent.

(A10) In any one of the active-pixel device assemblies denoted as (A1) through (A9), the rough opaque coating may have a thickness of at least 0.15 microns.

(A11) In any one of the active-pixel device assemblies denoted as (A1) through (A10), the active-pixel device may be selected from the group consisting of a complementary metal-oxide semiconductor image sensor and a liquid crystal on silicon device.

(B1) One method for manufacturing a stray-light-reducing coating for an active-pixel device assembly includes (a) depositing an opaque coating on a light-transmissive substrate such that the opaque coating forms a light-transmissive aperture, and (b) roughening the opaque coating to form a rough opaque coating, wherein the roughening includes treating the opaque coating with an alkaline solution.

(B2) In the method denoted as (B1), treating the opaque coating may further include baking to accelerate the roughening.

(B3) In either of the methods denoted as (B1) and (B2), the step of depositing the opaque coating may include depositing the opaque coating directly on the light-transmissive substrate.

(B4) Either of the methods denoted as (B1) and (B2) may further include, prior to the step of depositing the opaque coating, depositing a light-transmissive coating on the light-transmissive substrate, wherein (i) the step of depositing the opaque coating includes depositing the opaque coating on the light-transmissive coating with an interfacial surface of the opaque coating facing the light-transmissive coating and an external surface of the opaque coating facing away from the light-transmissive coating and (ii) the step of roughening the opaque coating includes roughening the light-transmissive coating together with the opaque coating such that the opaque coating is roughened on both the interfacial surface and the external surface.

(B5) Either of the methods denoted as (B1) and (B2) may further include, prior to the step of depositing the opaque coating, depositing a light-transmissive coating on the light-transmissive substrate and roughening the light-transmissive coating to form a rough light-transmissive coating having a rough surface facing away from the light-transmissive substrate, wherein (i) the step of depositing the opaque coating includes depositing the opaque coating on the rough light-transmissive coating, with an interfacial surface of the opaque coating facing the rough light-transmissive coating and an external surface of the opaque coating facing away from the rough light-transmissive coating and, such that the interfacial surface of the opaque coating is rough due to the roughness of the rough light-transmissive coating onto which it was deposited, and (ii) the step of roughening the opaque coating includes roughening the external surface of the opaque coating.

(B6) In either of the methods denoted as (B4) and (B5), the light-transmissive coating may include a material selected from the group that includes ethylene monomer, acrylic monomer, and epoxy monomer, and the light-transmissive coating containing silicon dioxide powder with a particle diameter between 0.5 microns to 5 microns.

(B7) In the method denoted as (B6), the light-transmissive coating may further include a photosensitive compound, wherein depositing a light-transmissive coating further includes patterning the light-transmissive coating with UV light exposure.

(B8) In any of the methods denoted as (B1) through (B7), the opaque coating may include a material selected from the group that includes ethylene monomer, acrylic monomer, and epoxy monomer, the opaque coating including carbon black pigment or dye.

(B9) In any of the methods denoted as (B1) through (B8), the opaque coating may include a photosensitive compound, wherein the step of depositing of the opaque coating further includes patterning the opaque material with UV light exposure.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An active-pixel device assembly with stray-light reduction, comprising:
    an active-pixel device including a semiconductor substrate and an array of active pixels;
    a light-transmissive substrate disposed on a light-receiving side of the active-pixel device, and including a first surface facing away from the active-pixel device; and
    a rough opaque coating, disposed on the first surface, that (i) forms an aperture aligned with the array of active pixels, (ii) has a rough interfacial side facing the light-transmissive substrate so as to suppress reflection of light incident on the rough opaque coating from the light-transmissive substrate, and (iii) has a rough external side facing away from the light-transmissive substrate so as to suppress reflection of light propagating toward the light-receiving side of the active-pixel device outside the aperture.

2. The active-pixel device assembly of claim 1, the light-transmissive substrate having a plurality of side faces that are substantially perpendicular to the first surface of the light-transmissive substrate, the rough opaque coating further disposed on the plurality of side faces of the light-transmissive substrate and forming a barrier to light.

3. The active-pixel device assembly of claim 2, the rough opaque coating having an interfacial side facing the light-transmissive substrate and an external side facing away from the light-transmissive substrate, the rough opaque coating being rough on its interfacial side so as to suppress reflection of light incident on the rough opaque coating from the light-transmissive substrate.

4. The active-pixel device assembly of claim 1, at least one side of the rough opaque coating having a surface roughness characterized by an arithmetic mean within the range of 0.1 micron to 1 micron.

5. The active-pixel device assembly of claim 1, at least one side of the rough opaque coating being characterized by a reflection coefficient that is less than 0.6 percent.

6. The active-pixel device assembly of claim 1, the rough opaque coating having a thickness of at least 0.15 microns.

7. The active-pixel device assembly of claim 1, the active-pixel device being selected from the group consisting of a complementary metal-oxide semiconductor image sensor and a liquid crystal on silicon device.

8. An active-pixel device assembly with stray-light reduction, comprising:
    an active-pixel device including a semiconductor substrate and an array of active pixels;
    a light-transmissive substrate disposed on a light-receiving side of the active-pixel device and including a first surface facing the active-pixel device; and
    a rough opaque coating, disposed on the first surface, that (i) forms an aperture aligned with the array of active pixels, (ii) has a rough interfacial side facing the light-transmissive substrate so as to suppress reflection of light incident on the rough opaque coating from the light-transmissive substrate, and (iii) has a rough external side facing away from the light-transmissive substrate so as to suppress reflection of light of light incident thereon.

* * * * *